United States Patent [19]
Widegren

[11] 3,985,373
[45] Oct. 12, 1976

[54] GOLF BAG WITH COLLAPSIBLE CART

[76] Inventor: John Gunnar Widegren, Floragatan 10, S-114 31 Stockholm, Sweden

[22] Filed: June 25, 1975

[21] Appl. No.: 590,240

[30] Foreign Application Priority Data
July 1, 1974 Sweden .............................. 7408665

[52] U.S. Cl. ............................. 280/652; 150/1.5 B; 280/47.26; 280/DIG. 6
[51] Int. Cl.² ......................................... B62B 1/20
[58] Field of Search ............. 280/36 C, 41 C, 41 D, 280/DIG. 6, 47.26, 640, 651, 652, 645, 655; 150/1.5 B

[56] References Cited
UNITED STATES PATENTS

| | | | |
|---|---|---|---|
| 2,482,372 | 9/1949 | Rossow | 150/1.5 |
| 2,629,609 | 2/1953 | Wilson | 280/36 C |
| 3,726,537 | 4/1973 | McLoughlin | 280/47.26 |
| 3,900,209 | 8/1975 | McDonnell | 280/36 C |

FOREIGN PATENTS OR APPLICATIONS
607,387   8/1948   United Kingdom............ 280/DIG. 6

Primary Examiner—Robert R. Song
Assistant Examiner—Michael J. Forman
Attorney, Agent, or Firm—Fred Philpitt

[57] ABSTRACT

An improved golf bag having a collapsible cart and comprising a frame that consists of at least two axially spaced-apart bracket members mutually connected through connecting means, and a pair of wheels detachably and rotatably mounted on legs secured to said frame. The bag-cart unit is adapted to be pulled with help of a handle attached to the frame, and the bracket members having a plurality of aligned openings. Said wheels having a diameter permitting stowing of the wheels within the bag coaxially with the bracket members, and through openings allowing the golf clubs to be inserted through the aligned openings of the wheels and the bracket members.

3 Claims, 3 Drawing Figures

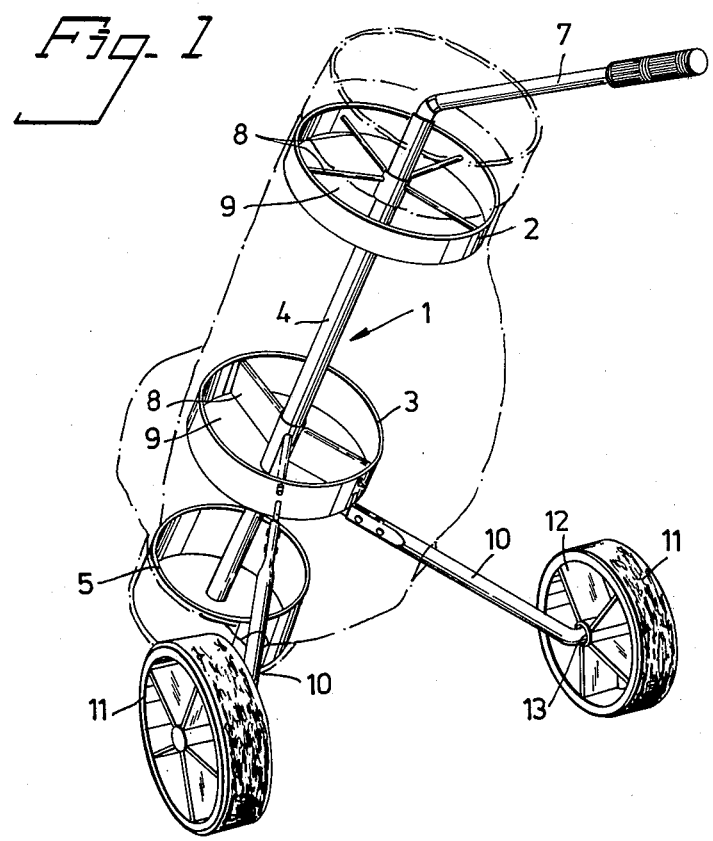
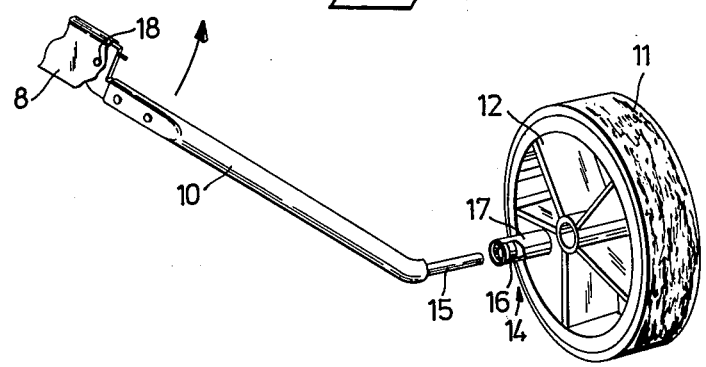

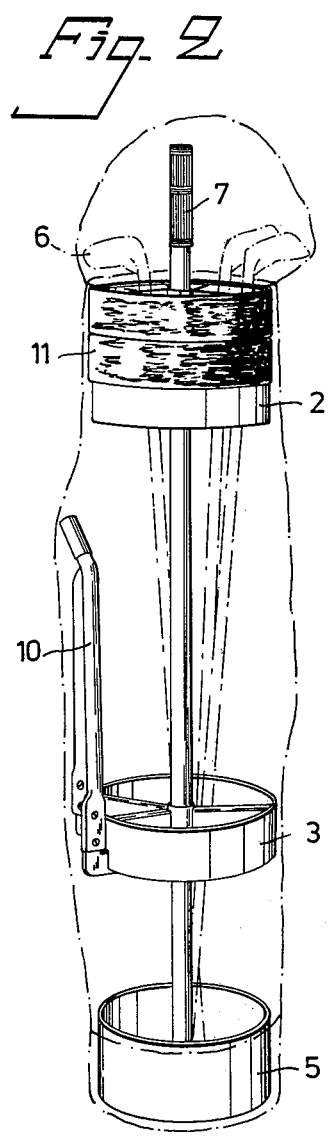

GOLF BAG WITH COLLAPSIBLE CART

The present invention relates to a golf bag having a collapsible cart and comprising a frame that consists of at least two axially spaced-apart bracket members mutually connected through connecting means, and a pair of wheels detachably and rotatably mounted on legs secured to said frame, the bag-cart unit being adapted to be pulled over a golf course with help of a handle attached to the frame. The spaced-part bracket members having a plurality of aligned openings through which the handles of the golf clubs are adapted to be inserted.

Previously known golf bags of the above-stated character require, when transported outside the golf course, additional space both outside and within the bag to accommodate the individual parts of the cart. Besides the fact that such bag-cart units in collapsed condition are clumsy and hard to handle the transportation costs thereof are essentially higher on some common means of communication as compared to conventional golf bags without carts.

The principle object of the present invention is therefore to provide a golf bag having such a collapsible cart that the bag and the cart in disassembled condition form a unit that is very compact and easy to handle. According to the invention all parts of the cart may be stowed within the bag without enlarging the space normally necessary for the accommodation of the golf clubs.

This object is achieved in that the wheels of the cart having a diameter permitting stowing of the wheels within the bag coaxially with the bracket members, and through openings allowing the golf clubs to be inserted through the aligned openings of the wheel bracket members.

The through openings of the wheels and have preferably a shape an dimensions which substantially correspond to those of the bracket members. In disassembled condition of the bag-cart unit the wheels are preferably resting on the upper bracket member of the frame of the bag.

The accompanying drawings and following description will further illustrate a practical and preferred embodiment of the invention.

In the drawings:

FIG. 1 is a perspective view of the golf bag unit in accordance with the present invention in assembled condition;

FIG. 2 shows the unit of FIG. 1 in collapsed condition; and

FIG. 3 is an enlarged fragment view of the wheel supporting arrangement.

Referring in detail to the drawings, the golf bag has a frame 1 comprising two axially spaced-apart, annular bracket members 2, 3 mutually connected by a tubular rod 4. The lower end of the tubular rod 4 carries a bottom support member 5 on which the handles of the golf clubs 6 are adapted to rest, and the upper end of the rod supports a pulling handle 7 that is retractable into the tubular rod 4. The bracket members 2, 3 are secured to the central rod 4 by means of spokes 8 which define openings 9 through which the clubs 6 are adapted to be inserted. At the lower bracket member 3 there are secured two legs 10 which support a wheel 11 at its outer end. As shown in FIG. 3, each wheel 11 has flanges 12 which define through openings 13 for a purpose later described. Furthermore, the wheels 11 are detachably and rotatably supported on a hub member 14 comprising a fixed shaft 15, bearing means 16 and a rotatable sleeve 17 that protects the bearing means 16. Each wheel 11 is held rotatably secured to the hub member 14 by means of a suitable quick-acting lock mechanism (not shown on the drawings) which is easily released when the wheels are to be disassembled. The inner end of each leg 10 is pivotable about a pivot pin 18 between an operative position in which the legs 10 extend through zippered slots in the bag (FIG. 1), and an inoperative position in which the legs extend substantially parallel to the axis of the bag (FIG. 2). In the operative position the legs 10 are locked by another suitable quick-acting lock mechanism (not shown on the drawings).

According to the invention the diameter and the through openings 13 of the wheels 11 are such that the wheels may be stowed within the bag coaxially with the bracket members 2, 3 so that the golf clubs can be inserted through the aligned openings of the brackets and wheels. The wheels 11 are preferably laid above the upper bracket member 2 as seen in FIG. 2, but alternatively the wheels 11 may be inserted under the lower bracket member 3 or between the bracket members 2, 3. In this way the wheels 11 do not require any additional space for storing them within the bag and the whole bag-cart unit can be kept more compact than wheel carried golf bags heretofore known.

While a preferred embodiment of the invention has been illustrated and described herein, it will be understood that the invention may be embodied in other forms within the scope of the claims without departing from the spirit of the invention.

What I claim is:

1. A device for carrying golf clubs, comprising in combination
   a. an upper bracket member having an external configuration that approximately defines the outer peripheral configuration of the upper portion of the carrying device,
   b. a lower bracket member having an external configuration that approximately defines the outer peripheral configuration of the lower portion of the carrying device,
   c. a member interconnecting said upper and lower bracket member so that said upper and lower bracket members are spaced apart from each other in generally parallel planes and in generally coaxial alignment,
   d. a pair of leg members mounted on the exterior of said lower bracket member and extending outwardly therefrom,
   e. two wheels that are adapted to be detachably mounted on the outwardly extending ends of said leg members,
   f. an upper support member extending above said upper bracket member and adapted to support both of said wheels above said upper bracket member in such a manner that said wheels can be stacked in a substantially parallel and axial alignment with both said bracket members, the area inwardly of the periphery of both said bracket members and said wheel members comprising a plurality of openings that can be axially aligned to accommodate the insertion of all of the golf clubs to be carried in the device,
   g. a handle member for pulling the assembled device.

2. A device according to claim 1 wherein said leg members are mounted on said lower bracket member in such a manner that they can be folded into a collapsed position.

3. A device according to claim 1 in which a bottom support member for golf clubs in diposed below said lower bracket member.

* * * * *